(12) United States Patent
Larsson et al.

(10) Patent No.: US 11,225,194 B2
(45) Date of Patent: Jan. 18, 2022

(54) CAMERA MIRROR SYSTEM VEHICLE INTEGRATION

(71) Applicant: Stoneridge Electronics AB, Solna (SE)

(72) Inventors: Martin Larsson, Bromma (SE); Stefan Andersson, Stockholm (SE)

(73) Assignee: Stoneridge Electronics AB, Solna (SE)

( * ) Notice: Subject to any disclaimer, the term of this patent is extended or adjusted under 35 U.S.C. 154(b) by 0 days.

(21) Appl. No.: 16/876,352

(22) Filed: May 18, 2020

(65) Prior Publication Data

US 2020/0361384 A1    Nov. 19, 2020

Related U.S. Application Data

(60) Provisional application No. 62/848,689, filed on May 16, 2019.

(51) Int. Cl.
| | | |
|---|---|---|
| *B60R 1/12* | (2006.01) | |
| *B60R 11/02* | (2006.01) | |
| *H04L 29/06* | (2006.01) | |
| *H04L 12/40* | (2006.01) | |

(52) U.S. Cl.
CPC ............. *B60R 1/12* (2013.01); *B60R 11/02* (2013.01); *H04L 63/10* (2013.01); *H04L 2012/40215* (2013.01)

(58) Field of Classification Search
CPC ... B60R 1/12; B60R 2001/1253; H04L 63/10; H04L 2012/40215
See application file for complete search history.

(56) References Cited

U.S. PATENT DOCUMENTS

| | | | | |
|---|---|---|---|---|
| 2016/0003621 | A1* | 1/2016 | Koenig | G06F 3/04845 701/31.4 |
| 2016/0101728 | A1* | 4/2016 | Chan | B60Q 9/00 340/447 |
| 2018/0040248 | A1* | 2/2018 | Bigham | H04N 7/181 |
| 2019/0193728 | A1* | 6/2019 | Tanaka | B60W 30/10 |
| 2020/0084352 | A1* | 3/2020 | Conger | H01R 27/02 |

FOREIGN PATENT DOCUMENTS

EP    1177951 A2 *   2/2002    ......... B60R 16/0207

* cited by examiner

*Primary Examiner* — Benyam Haile
(74) *Attorney, Agent, or Firm* — Carlson, Gaskey & Olds, P.C.

(57) ABSTRACT

A vehicle camera mirror system includes a CAN bus that carries vehicle parameter data having vehicle speed, steering angle, braking and/or engine RPM. A driver information system (DIS) graphically displays the vehicle parameter data to a driver, and a camera mirror system includes a camera which has a field of view at least one of Class II and Class IV views. A display is in communication with the camera and is configured to display the field of view, and a controller is in communication with the camera and the display. A wiring harness has first and second connectors that are respectively connected to the CAN bus and the DIS. The wiring harness includes a pigtail that has first and second wires that are electrically connected between the first and second connectors. The first and second wires are connected to the controller to provide the vehicle parameter data.

8 Claims, 3 Drawing Sheets

CAMERA MIRROR SYSTEM VEHICLE INTEGRATION

CROSS-REFERENCE TO RELATED APPLICATIONS

This application claims priority to U.S. Provisional Application No. 62/848,689 which was filed on May 16, 2019, and is incorporated herein by reference.

BACKGROUND

A typical modern vehicle includes a Controller Area Network (CAN) bus that transmits data to and from various onboard vehicle controllers and vehicle sensors. Numerous bundles of wires and wire connectors are used to interconnect to the CAN bus to vehicle systems. One example vehicle system is a driver information system (DIS), which provides an instrument cluster display to the driver for graphically depicting various vehicle parameters, such as speed, engine RPM and various other vehicle functions.

SUMMARY OF THE INVENTION

In one exemplary embodiment, a vehicle camera mirror system includes, among other things, a CAN bus that is configured to carry vehicle parameter data that includes vehicle speed, steering angle, braking and/or engine RPM. The system also includes a driver information system (DIS) that is configured to graphically display the vehicle parameter data to a driver. The vehicle parameter data includes at least one of vehicle speed and engine RPM. The system further includes a camera mirror system that includes a camera which has a field of view at least one of Class II and Class IV views. The system further includes a display that is in communication with the camera and is configured to display the field of view. The system further includes a controller that is in communication with the camera and the display. The system further includes a wiring harness that has first and second connectors that are respectively connected to the CAN bus and the DIS. The wiring harness includes a pigtail that has first and second wires that are electrically connected between the first and second connectors. The first and second wires are connected to the controller to provide the vehicle parameter data.

In a further embodiment of any of the above, the CMS includes at least first and second displays that are respectively arranged in proximity to left and right A-pillars.

In a further embodiment of any of the above, the first and second connectors are each provided by at least one of female and male connectors.

In a further embodiment of any of the above, the wiring harness includes a sub-harness that provides the second connector. The sub-harness is plugged into an adapter that provides the first connector.

In a further embodiment of any of the above, the adapter includes a printed circuit board (PCB) that has multiple traces that provide a pin-to-pin connection between the first connector and another connector that receives the sub-harness.

In a further embodiment of any of the above, the first and second wires are soldered to holes that are provided in the traces.

In a further embodiment of any of the above, only two wires are provided by the pigtail.

In another exemplary embodiment, a wiring harness for a vehicle camera mirror system includes, among other things, a wiring bundle has connectors that are configured to be respectively connected to a CAN bus and a drive information system. A pigtail of first and second wires are electrically connected between the connectors. The first and second wires are configured to be connected to a camera mirror system.

In a further embodiment of any of the above, the wiring harness includes a sub-harness that provides the second connector. The sub-harness is plugged into an adapter that provides the first connector.

In a further embodiment of any of the above, the adapter includes a printed circuit board (PCB) that has multiple traces that provide a pin-to-pin connection between the first connector and another connector that receives the sub-harness.

In a further embodiment of any of the above, the first and second wires are soldered to holes that are provided in the traces.

In a further embodiment of any of the above, only two wires are provided in the pigtail.

In another exemplary embodiment, a method of installing a camera mirror system (CMS) in a vehicle includes, among other things, a wiring harness that is plugged into a CAN bus and a driver information system (DIS). The wiring harness has a pigtail with first and second wires. A pigtail is connected to a CMS. The method further includes vehicle parameter data that is provided from the CAN bus to the DIS and the CMS via the wiring harness. The vehicle parameter data includes at least one of vehicle speed and engine RPM.

In a further embodiment of any of the above, the plugging step includes connecting the first connector to the CAN bus and connecting the second connector to the DIS.

In a further embodiment of any of the above, the wiring harness includes a sub-harness that provides the second connector. The sub-harness is plugged into an adapter that provides the first connector.

In a further embodiment of any of the above, the adapter includes a printed circuit board (PCB) that has multiple traces that provide a pin-to-pin connection between the first connector and another connector that receives the sub-harness.

In a further embodiment of any of the above, the first and second wires are soldered to holes that are provided in the traces.

In a further embodiment of any of the above, only two wires are provided by the pigtail.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
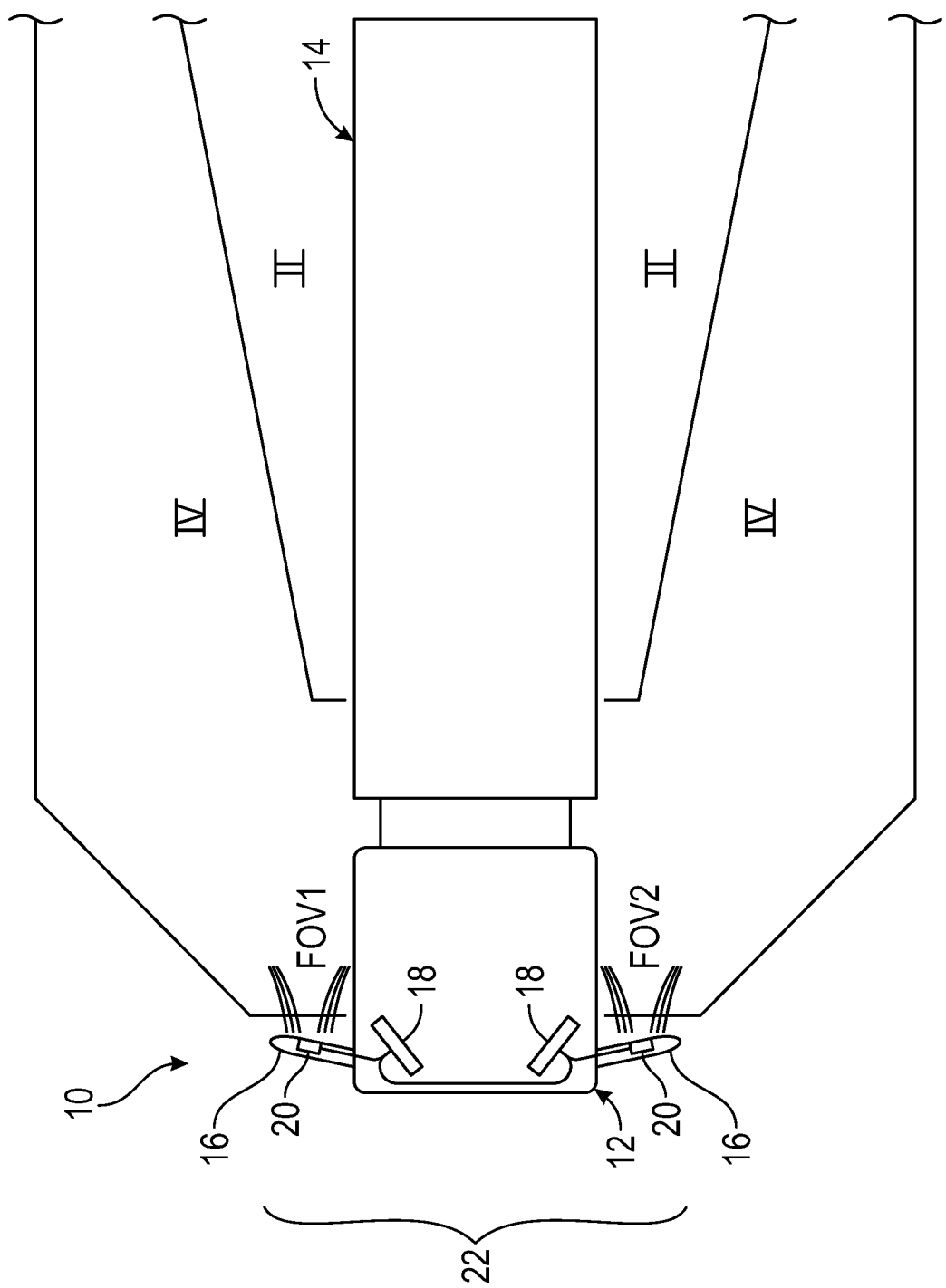
FIG. 1 is a schematic top elevation view of a commercial truck with a camera mirror system (CMS) providing Class II and Class IV views.

A schematic view of a commercial vehicle 10 is illustrated in FIG. 1. The vehicle 10 includes a vehicle cab 12 for towing a trailer 14. Driver and passenger side camera arms 16 are mounted to the vehicle cab 12. If desired, the camera arms 16 may include conventional mirrors integrated with them as well. First and second displays 18 are arranged on each of the driver and passenger sides within the vehicle cab 12 near the A-pillars to display Class II and Class IV views on each side of the vehicle 10.

A rearward facing camera 20 is arranged within each camera arm 16. The cameras 20 provide a field of view FOV1, FOV2 that includes at least one of the Class II and Class IV views. Multiple cameras also may be used on each camera arm 16, if desired. The system 10 may provide one or more cameras directed at the Class V and Class VI views instead or additionally.

Figure 2:
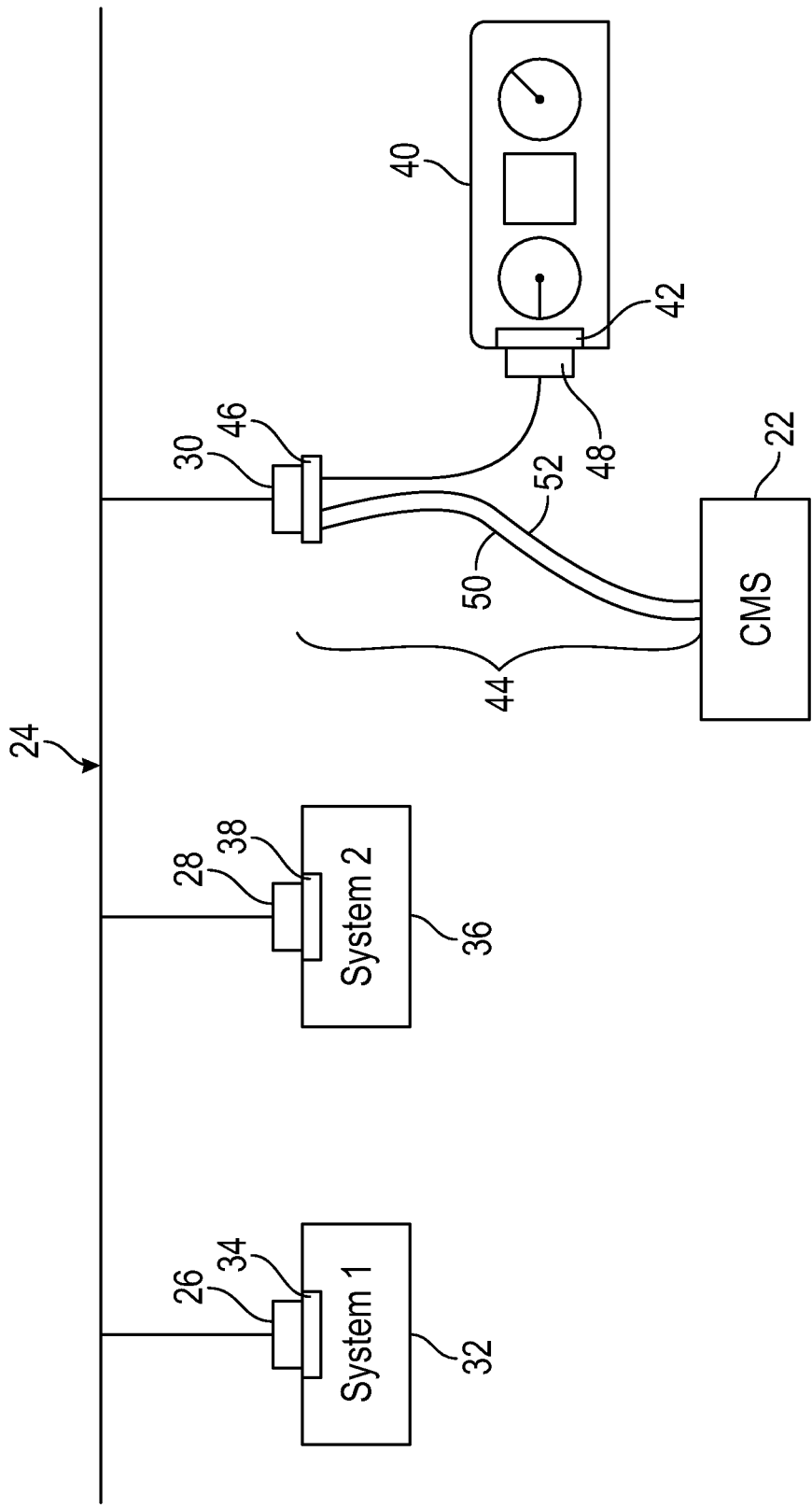
FIG. 2 is a schematic view of a CAN bus with various systems connected thereto, and an example wiring harness interconnected to both a driver information system (DIS) and a CMS.

A CAN bus 24 is schematically illustrated in FIG. 2. A LIN bus may also be used, and "CAN bus" is intended to include a LIN bus in this disclosure. It is desirable to provide accurate, reliable connections to the CAN bus for proper systems operation. Various systems, such as first and second systems 32, 36 are in communication with the CAN bus 24. There are typically a limited number of connections (e.g., male and/or female electrical connectors) supplied from the vehicle manufacturer to provide access to the CAN bus.

In one example, first, second and third connectors 26, 28, 30 are interconnected to the CAN bus 24; of course, more or few connectors may be provided. The first, second and third connectors 26, 28, 30, which are OEM-original, carry vehicle parameter data over bundles of wires, for example. In one example, the first and second systems 32, 36 respectively include first and second system connectors 34, 38 that respectively couple with the second connectors 26, 28. The wires connected to each of these connectors may vary such that different vehicle data are supplied to the connected systems.

The third connector 30 carries vehicle data parameters used by a driver information system (DIS) 40, which may include vehicle speed, steering angle, braking, and/or engine RPM, among other data. This same data may also be useful with the CMS 22, for example, by providing information for a panning function.

"Panning" is where the camera or displayed image is adjusted to show different portions of the section behind the vehicle in a similar way as the user achieves through moving his head in relation to a mirror in a conventional rear or side view mirror system. That is, panning adjusts what is displayed to the driver so that the trailer does not obstruct the rearward viewing while turning or allow the trailer to leave the driver's view. Panning is particularly useful for commercial trucks towing a trailer that articulates with respect to a cab. The trailer's position relative to the cab may be determined in a variety of ways, for example, calculating the position of the rear end of the trailer, determining the angle of the trailer relative to the cab, and/or identifying the trailer based on object recognition.

Returning to FIG. 2, a wiring harness 44 is used to connect from a single OEM-supplied connector, i.e., the third connector 30, to both the CMS 22 and the DIS 40. Thus, the CMS 22 and DIS 40 share a common connector to obtain CAN bus information from the same source. The wiring harness 44 provides an easy to install, reliable connection, particularly where an additional connection to the CAN bus 24 is not available in a given OEM configuration. The wiring harness 44 is particularly useful for situations in which a CMS 22 will be installed in an aftermarket setting.

The wiring harness 44 includes first and second connectors 46, 48, which respectively plug into the CAN bus 24 and the DIS 40. A pigtail providing first and second wires 50, 52 is electrically connected between the first and second connectors 46, 48. In one example, only two wires are provided in the pigtail to carry the vehicle parameter data. The wires carries the vehicle information configured in a manner typically found in CAN bus protocols. The wires may have colored insulation that readily identifies their use according to typical vehicle wiring schemes. Significantly, in this two-wire configuration, no additional power wire is needed, thus, providing a simplified, reliable configuration. Thus, in one example, the CMS 22 receives power from a power source other than the wiring harness. However, other wires may be added to the pigtail, if desired.

Figure 3:
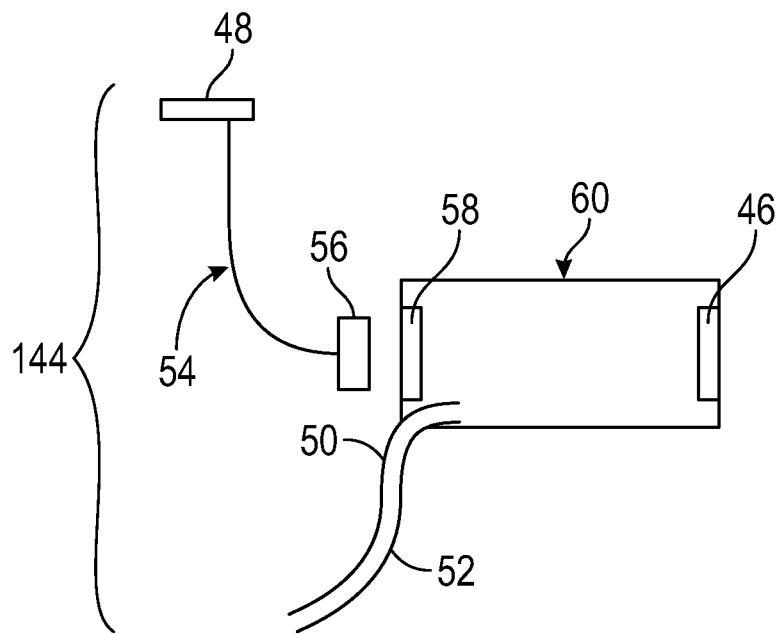
FIG. 3 is a schematic view of another example wiring harness.
Figure 4:
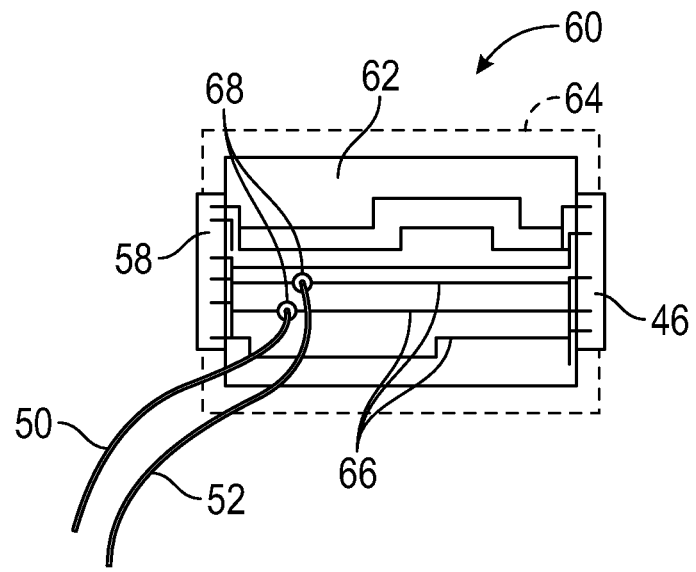
FIG. 4 is a schematic view of an adapter used with the wiring harness shown in FIG. 3.

Another example wiring harness configuration is shown in FIGS. 3 and 4. The wiring harness 144 includes a sub-harness 54, which may be a relatively short, off-the-shelf wiring bundle supplying the first connector 46 and another connector 56. The wiring harness 144 also includes an adapter 60, which provides the first connector 46 and another connector 58. The pigtail may be provided off of the adapter 60, as shown, or off of the sub-harness 54.

One example adapter 60 is shown in more detail in FIG. 4. The adapter 60 is configured as a breakout board or box having a printed circuit board (PCB) 62 with traces 66 providing a pin-to-pin connection between the first connector 46 and the other connector 58. In one example, holes 68 are provided in at least two of the traces 66 to provide a junction for soldering points for the first and second wires 50, 52. The PCB 62 may be enclosed within a housing 64.

The disclosed system and method makes it easy for an installer or manufacturer to access vehicle CAN data in trucks without damaging the truck's harness or its connectors. The current ways to tap into CAN data in vehicles are expensive, inconvenient and/or risk damage to the vehicle harness wires or its connectors. For example, connecting to the OBD diagnostic port could be inconvenient for the driver because the location of the OBD connector causes the wires to stick out by the driver's legs or feet. CAN sniffers, which are active electronics devices, can be squeezed between CAN wires in the vehicle harness, but they contain active electrical components and require external power supply making a CMS potentially more complicated. The disclosed system and method provides a simple, passive system with no active parts, thus avoiding complexity o risk of breaking. The disclosed wiring harness is not in the path of the driver, so it does not cause driver inconvenience.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A vehicle camera mirror system comprising:
    a CAN bus configured to carry vehicle parameter data including vehicle speed, steering angle, braking and/or engine RPM, the CAN bus having multiple CAN bus connectors;
    a driver information system (DIS) configured to graphically display at least some of the vehicle parameter data to a driver, the at least some of the vehicle parameter data including at least one of vehicle speed and engine RPM;
    a camera mirror system (CMS) comprising:
        a camera having a field of view at least one of Class II and Class IV views;
        a display in communication with the camera and configured to display the field of view;
        a controller in communication with the camera and the display; and
    a wiring harness having first and second connectors, the first connector connected to one of the CAN bus connectors, and the second connector connected to the DIS, the wiring harness including a pigtail having first and second wires electrically connected between the first connector and the controller such that the DIS and the CMS share the same one of the CAN bus connectors.

2. The system of claim 1, wherein the CMS includes at least first and second displays that are respectively arranged in proximity to left and right A-pillars.

3. The system of claim 1, wherein the first and second connectors are each provided by at least one of female and male connectors.

4. The system of claim 3, wherein the wiring harness includes a sub-harness providing the second connector, the sub-harness is plugged into an adapter providing the first connector.

5. The system of claim 4, wherein the adapter includes a printed circuit board (PCB) having multiple traces providing a pin-to-pin connection between the first connector and another connector that receives the sub-harness.

6. The system of claim 5, wherein the first and second wires are soldered to holes provided in the traces.

7. The system of claim 1, wherein only two wires are provided by the pigtail.

8. The system of claim 1, wherein the multiple CAN bus connectors are OEM-supplied connectors.

* * * * *